Jan. 10, 1928.
F. W. HOLDERLE ET AL
1,655,544
FOOD CONTAINER
Filed Feb. 3, 1926
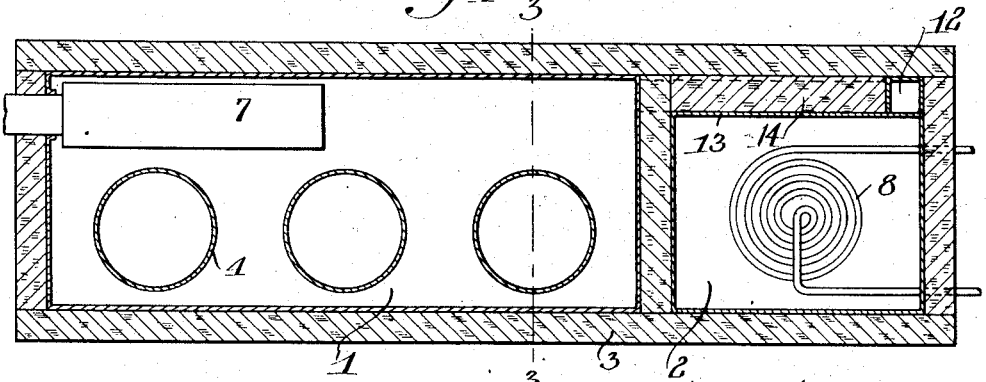
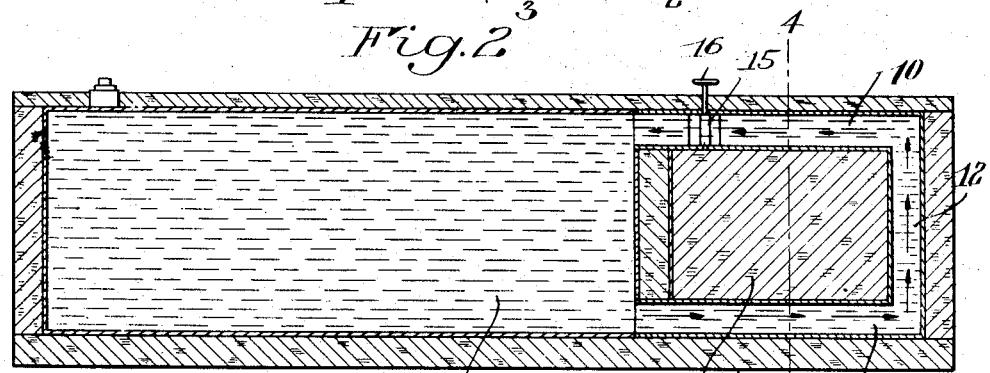
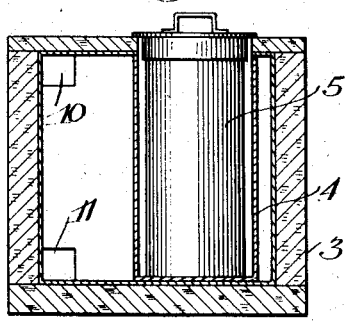
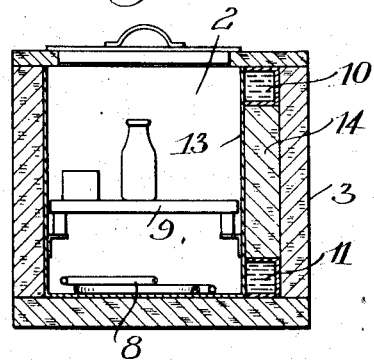
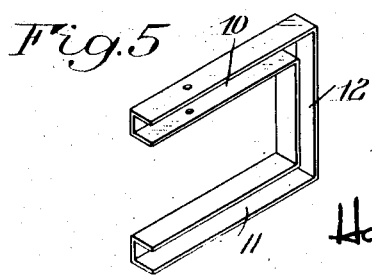
INVENTORS
Frederick W. Holderle
Carl F. Holderle
BY Harold R. Stonehart
their ATTORNEY Patented Jan. 10, 1928.

1,655,544

UNITED STATES PATENT OFFICE.

FREDERICK W. HOLDERLE AND CARL L. HOLDERLE, OF ROCHESTER, NEW YORK.

FOOD CONTAINER.

Application filed February 3, 1926. Serial No. 85,798.

This invention relates to a food container, and has special application to the general type of construction used in ice cream and soft drink dispensaries where one part of a cabinet is employed for keeping ice cream at a low temperature while another portion of the cabinet is kept at a somewhat higher temperature but sufficiently cold for maintaining liquid conducting coils, bottled goods and other food products at a proper temperature slightly above freezing.

One object of the invention is to afford a simple and practical construction which can be readily controlled by an attendant, to keep a desired temperature within a cooling chamber.

A further object of the invention is to provide a refrigerant conductor in such relation to a cooling chamber as to definitely prevent freezing of any products in the latter, while at the same time maintaining a sufficiently cold temperature therein at all times.

Another object of the improvement is to afford a simplified construction that can be manufactured at reasonable cost, which will perform the various necessary functions while occupying a minimum floor space.

An additional object of the improvement is to employ a refrigerant conductor in conjunction with a cooling chamber, so as to eliminate the necessity of using water in the cooling chamber, thereby permitting the latter to be employed in the double capacity of housing and cooling soda and other liquid coils, and also to be used as a cooling cabinet for bottled goods and other food products intended to be kept at a temperature slightly above freezing.

To these and other ends, the invention comprises the structure that will appear clearly from the following description when read in conjunction with the accompanying drawings, the novel features being pointed out in the claims following the description.

In the drawings:

Figure 1 is a horizontal sectional view of a food container, incorporating a preferred embodiment of the several features of the invention;

Figure 2 is a longitudinal vertical sectional view taken centrally through the refrigerant conductor;

Figure 3 is a sectional view on line 3—3 of Figure 1;

Figure 4 is a sectional view on line 4—4 of Figure 1, and

Figure 5 is a detail perspective view of the unit which cooperates with a wall of the cooling chamber to form the refrigerant conductor.

Referring more particularly to the drawings, in which like reference characters refer to corresponding parts in the several views, the structure in which we have seen fit to illustrate one embodiment of the invention includes a refrigerant chamber 1, and a cooling chamber 2, separated from each other and both surrounded by suitable insulating means such as a cork body 3. The refrigerant chamber 1 is provided with a series of receptacles 4 for containing ice cream cans 5, and holds a suitable refrigerant 6, such as a solution of alcohol and water, that is kept at a proper temperature by a refrigerating unit 7, which may be any conventional type of ice making or refrigerating machine.

The refrigerant chamber 1 is used to hold ice cream cans 5, and to maintain their contents at the required temperature, while the cooling chamber 2 is adapted for properly cooling soda or liquid coils 8, and bottled goods or other products that are stored in the chamber 2 above the coils 8, for which purpose a rack 9 may be provided. Necessarily, the temperature in cooling chamber 2 is maintained somewhat higher than in refrigerant chamber 1, since it is essential to prevent freezing of the contents in chamber 2, and in order to use the refrigerant 6 from chamber 1, for maintaining the temperature in the cooling chamber 2 at a proper point above freezing, the following structure is provided.

Connecting with the top and bottom portions of the refrigerant chamber 1, and preferably to one side of cooling chamber 2, is a circulatory refrigerant conductor, preferably U-shaped, affording upper and lower branches 10 and 11 extending laterally of the cooling chamber opposite the upper and lower portions thereof, and a vertical branch 12 connecting said lateral branches. The refrigerant conductor is located outside and in juxta-relation to the cooling chamber 2, and is preferably formed by affixing a metal unit, such as designated in Figure 5, to the outside of a side wall of the cooling chamber 2, such side wall 13 constituting one wall of the refrigerant conductor, as shown in Figure 4.

Located between the top and bottom branches 10 and 11 of the refrigerant conductor is an insulating body 14 of cork or other suitable material, which as shown in Figure 4, occupies the space between wall 13 of the cooling chamber 2 and the outer cork or insulating wall 3. By this arrangement, a substantial difference in temperature of the refrigerant in the upper and lower branches 10 and 11 is caused, and the refrigerant in the upper branch 10 being always at a higher temperature causes a continuous circulation of the refrigerant as shown by the arrows in Figure 2. This effects constant cooling of chamber 2, the bottom portion being kept at a slightly lower temperature than the upper portion, due to the difference between the temperatures of the upper and lower branches 10 and 11 of the refrigerant conductor. 15 is a valve, located preferably in the upper branch 10 of the refrigerant conductor, its handle 16 being conveniently accessible to an attendant, and operable, when desired, to control or shut off circulation of refrigerant through the conductor, and thus raise the temperature in the cooling chamber. By means of properly adjusting valve 15 to regulate the flow of refrigerant through the conductor, the temperature in the cooling chamber 2 can be maintained to a nicety at any required point. If desirable, the liquid coils 8 in the cooling chamber 2 can be immersed in a body of water of sufficient depth only to cover the coils, although this is not necessary, since the temperature of the liquid in coils 8 can be properly maintained through cooling the air in chamber 2, and thus formation of ice within the cooling chamber is entirely avoided.

While the invention has been described with reference to a particular embodiment, it is not to be understood as restricted to the details herein shown, and this application is intended to cover any modifications coming within the principle underlying the invention, or the scope of the following claims.

We claim:

1. In a food container, the combination with a refrigerant chamber, of a cooling chamber, and a circulatory refrigerant conduit located outside the cooling chamber, said conduit being in communication with the top and bottom of the refrigerant chamber and extending therefrom into heat exchanging relation to a wall of the cooling chamber.

2. In a food container, the combination with a refrigerant chamber, of a cooling chamber, and means connected with the refrigerant chamber for conducting the refrigerant outside and adjacent to a wall of the cooling chamber in a path laterally across the bottom portion of the said wall, thence upwardly and laterally across the upper portion of the said wall.

3. In a food container, the combination with a refrigerant chamber, of a cooling chamber, and a refrigerant conduit located outside the cooling chamber and extending from the refrigerant chamber into heat exchanging relation to a wall of the cooling chamber, said wall of the cooling chamber forming one wall of the refrigerant conduit.

4. In a food container, the combination with a refrigerant chamber, of a cooling chamber, and a U-shaped refrigerant conductor connecting with the top and bottom portions of the refrigerant chamber and located outside and adjacent to a wall of the cooling chamber.

5. In a food container, the combination with a refrigerant chamber, of a cooling chamber, a U-shaped refrigerant conductor connecting with the top and bottom portions of the refrigerant chamber and extending across the top and bottom portions of the cooling chamber exteriorly thereof, and insulating means interposed between the top and bottom branches of said U-shaped refrigerant conductor.

6. In a food container, the combination with a refrigerant chamber, of a cooling chamber, and a U-shaped refrigerant conductor connecting with the top and bottom of the refrigerant chamber, one wall of the cooling chamber forming one wall of the refrigerant conductor, which latter is located outside the cooling chamber and extends laterally across the top and bottom portions thereof, and insulating means interposed between the top and bottom branches of said U-shaped conductor.

7. In a food container, the combination with a refrigerant chamber, of a cooling chamber, a U-shaped refrigerant conductor in operative relation with the top and bottom portions of said cooling chamber, and insulating means between the top and bottom branches of said conductor.

In witness whereof, we have hereunto signed our names.

FREDERICK W. HOLDERLE.
CARL L. HOLDERLE.